United States Patent [19]

Di Fiore

[11] 4,330,083
[45] May 18, 1982

[54] HOME HEATING SYSTEM

[76] Inventor: Dante Di Fiore, 5387 Wilson Mills Rd., Highland Heights, Ohio 44143

[21] Appl. No.: 143,277

[22] Filed: Apr. 24, 1980

[51] Int. Cl.³ .............................................. F24D 3/00
[52] U.S. Cl. ..................................... 237/56; 126/132; 126/164; 126/126
[58] Field of Search ...................... 237/8 R, 19, 56, 51, 237/55; 126/134, 132, 152, 164, 120, 126; 122/20 B

[56] References Cited

U.S. PATENT DOCUMENTS

| 738 | 11/1852 | Coad | 126/120 |
| 3,685,733 | 8/1972 | Frithjof | 237/19 |
| 4,046,320 | 9/1977 | Johnson et al. | 237/51 |

FOREIGN PATENT DOCUMENTS 1559958  1/1980  United Kingdom ............... 237/55

*Primary Examiner*—Albert J. Makay
*Assistant Examiner*—Henry Bennett
*Attorney, Agent, or Firm*—Burge & Porter Co.

[57] ABSTRACT

Combustion heat energy from a fireplace or a wood-burning stove is transferred by a circulating flow of water for utilization elsewhere in a home. The heating system includes a chamber-defining structure configured to be positioned in a conventional fireplace or in a conventional wood-burning stove so that water in the chamber is heated by combustion in the fireplace or the stove. In one application the heating system is utilized to transfer heat to a heat-energy-consuming appliance such as a water heater or a clothes dryer. In another application, the heating system is utilized to transfer heat energy to a conventional home hot water heating system. Features of the heating system include a novel construction of a fireplace heating unit, and a specially configured hot-water heater which positively prevents water from the heating system co-mingling with the household drinking water. The system enables a homeowner to utilize a fireplace or a woodburning stove in much the same way a spare tire is used in conjunction with an automobile, namely as an auxiliary or substitute resource which is available when needed.

8 Claims, 4 Drawing Figures

HOME HEATING SYSTEM

BACKGROUND OF THE INVENTION

1. Field of the Invention

The present invention relates generally to the saving of energy in the environment of a home through the use of a heating system for transferring combustion heat energy from a fireplace or wood-burning stove via circulating water to a heat-energy-consuming appliance and/or to a home hot water heating system.

2. Prior Art

While combustion heat energy generated in a fireplace or wood-burning stove has been utilized to directly heat a room of a building structure, the need has not been fully satisfied for a simple and inexpensive auxiliary system for saving energy in the environment of a home by efficiently transferring combustion heat energy generated in a fireplace or a wood-burning stove to a remote point for utilization. Although various types of air circulating conduit systems have been provided for use with fireplaces, these systems are quite limited in their heating capabilities and are not suitable for transferring heat energy any significant distance or through walls to a remote location.

While proposals have been made to utilize devices of various configurations for heating water in a chamber which is exposed to heat of combustion, these proposals have not addressed the need for a full-scale, simple and inexpensive, highly versatile, auxiliary heating system which is capable of transmitting combustion heat energy from fireplace or a wood-burning stove to any of a number of remotely located heat-consuming appliances and/or to a circulating hot water heating system.

SUMMARY OF THE INVENTION

The present invention overcomes the foregoing and other drawbacks of prior proposals by providing a novel and improved heating system of simple and inexpensive construction which can be utilized to transfer combustion heat energy from a fireplace or a wood-burning stove to any of a selected number of remotely located home appliances and/or to a circulating hot water home heating system.

A heating system embodying the preferred practice of the present invention includes a heating unit having a chamber-defining structure positioned such that combustion heat generated in a fireplace or wood-burning stove will cause water supplied to the chamber to be heated while in the chamber. Inlet and outlet conduits duct relatively cold water to the chamber and duct heated water from the chamber. Control valves are provided to selectively communicate the inlet and outlet conduits with one or more heat-energy-consuming home appliances and/or a circulating-hot-water home heating system, whereby combustion heat energy generated in a fireplace or a wood-burning stove can be transferred to and utilized efficiently at a remote location. Typical heat-energy-consuming appliances which may make use of the fireplace heating system of the present invention include home hot water heaters, clothes dryers, dishwashers, and the like.

An arrangement of control valves is employed to permit the heating system to supply heat energy selectively to home appliances and/or to a circulating hot water home heating system, or to any selected combination of the appliances and the home heating system. The control valves may also be used to close the inlet and outlet conduits to the heating unit so that, when the associated fireplace or stove is not in operation, the heating unit will not serve as a heat-sink drawing energy from the appliances and/or the circulating hot water home heating system.

A significant feature of the heating system of the present invention is its simple and straightforward character which enables non-technically trained persons to understand and effectively operate the system. Moreover, non-technical persons can do most, if not all, of the work involved in installing the system.

Where the system is utilized in conjunction with an existing fireplace, it can be installed without diminishing the aesthetics of the fireplace. A typical fireplace installation may utilize a heating unit having upper and lower chamber-defining portions. The upper portion is positioned to overlie the combustion area. The lower portion is positioned to support fuel for combustion in the fireplace or stove. Valve-controlled riser conduits interconnect the lower and upper chamber-defining portions. These components may be configured to conform to the shape of the fireplace opening and so that the resulting installation has a good appearance.

While conventionally configured heat-consuming appliances of various types may be coupled to the system of the present invention to receive combustion heat energy transferred from a fireplace or a woodburning stove, one aspect of the present invention includes novel and improved, specially configured appliances for use with the system. A novel dishwasher or clothesdryer type appliance is described, as is a hot water heater. An important feature of the hot water heater lies in the use of a dual-shell construction which prevents water from the heating system intermixing with water from the home drinking water system.

These and other features, and a fuller understanding of the present invention may be had by referring to the following description and claims taken in conjunction with the accompanying drawings.

DESCRIPTION OF THE PREFERRED EMBODIMENT

Figure 1:
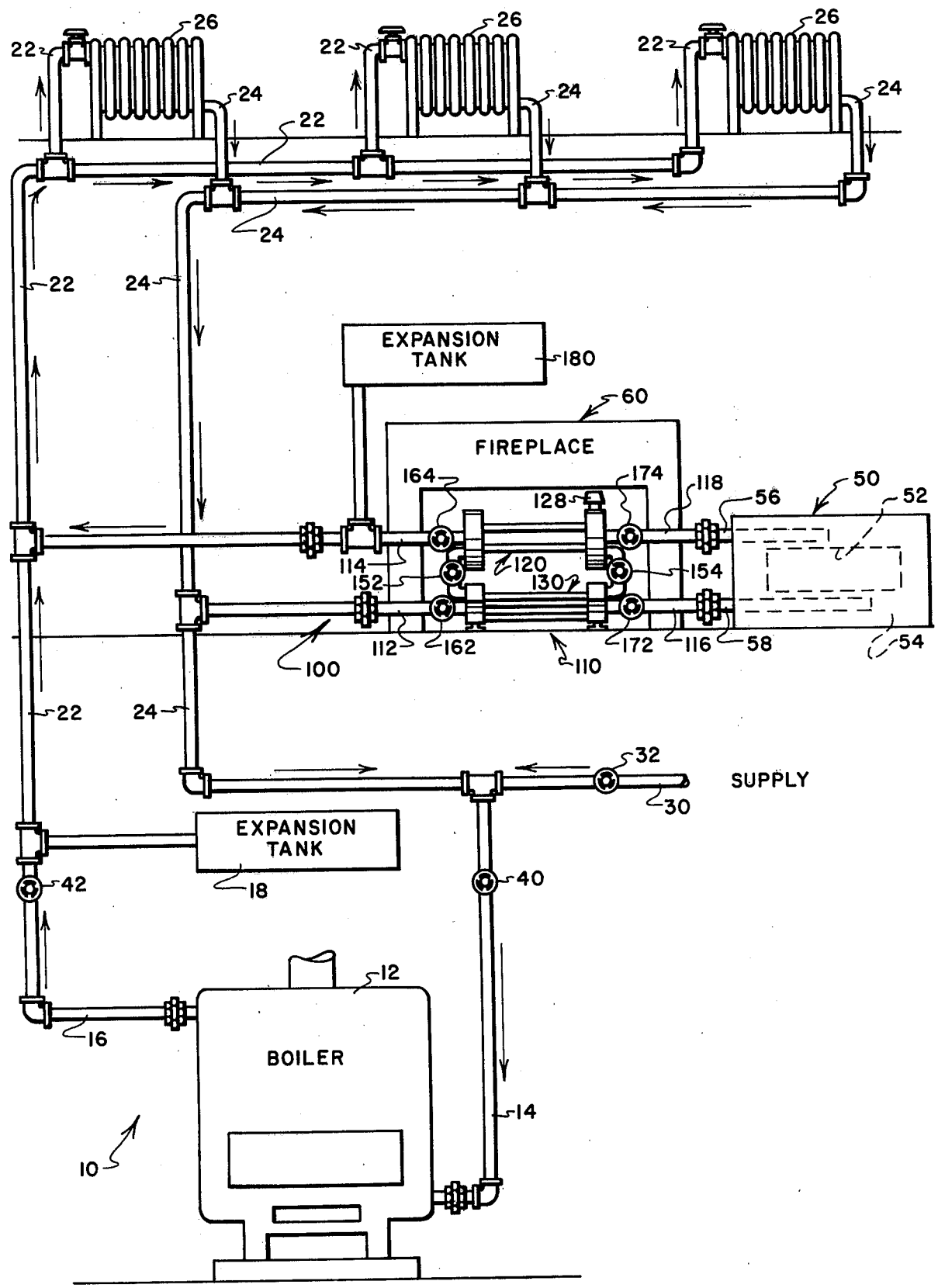
FIG. 1 is a schematic view illustrating the general arrangement of components of a circulating hot water home heating system and of a heat-energy-consuming appliance with a fireplace heater system embodying the preferred practice of the present invention connected thereto.

Referring to FIG. 1, a circulating hot water home heating system is indicated generally by the numeral 10. A heat-energy-consuming appliance is indicated generally by the numeral 50. A fireplace is indicated generally by the numeral 60. A fireplace heating system embodying the preferred practice of the present invention is indicated generally by the numeral 100. The system 100 includes a fireplace heating unit 110. A pair of inlet and outlet conduits 112, 114 connect the fireplace heating unit 110 to the circulating hot water heating system 10. A pair of inlet and outlet conduits 116, 118 connect the fireplace heating unit 110 to the heat-energy-consuming appliance 50.

The circulating hot water home heating system 10 includes a conventional furnace or boiler 12 for heating relatively cold water supplied to the boiler 12 through an inlet conduit 14. Heated water discharges from the boiler 12 through an outlet conduit 16. An expansion tank 18 connects with the outlet conduit 16, as is conventional to accommodate expansion and contraction of the volume of circulating water in the system. Supply and return pipes 22, 24 transfer hot water to and cold water from a plurality of parallel-connected room-heating radiators 26. A cold water supply line 30 is connected by a supply valve 32 to the line 24. A supply valve 40 is provided for selectively communicating the inlet and return conduits 14, 24. An outlet valve 42 is provided for selectively communicating the outlet and supply conduits 16, 22.

In operation, the boiler 12 heats water supplied through the inlet conduit 14 and delivers heated water to the radiators 26 through the outlet and supply conduits 16, 22. Heated water supplied to the radiators 26 cools during its passage through the radiators 26 and returns to the boiler 12 through the return and inlet conduits 24, 14. The system 10 is essentially a closed system inasmuch as it recirculates water in a closed loop. Any make-up water which is needed by the system 10 is supplied through the supply valve 32.

The heat-energy-consuming appliance 50 can be of any type which is capable of utilizing heat energy supplied by a circulating flow of heated water. The appliance 50 can comprise a water heater or clothes dryer or dishwasher or the like wherein a substance or articles to be heated are positioned in a chamber indicated by the numeral 52. A water jacket 54 surrounds at least a part of the chamber 52 and is configured such that, when heated water is supplied to the water jacket 54, heat energy from the water in the jacket 54 is transferred to the chamber 52. A delivery pipe 56 connects with the outlet conduit 118 for supplying heated water to the upper region of the water jacket 54. A return pipe 58 connects with the inlet conduit 116 for withdrawing water from the lower region of the water jacket 54. As water circulates through the water jacket 54 on its way from the delivery pipe 56 to the return pipe 58, heat energy is transferred from the water to such substance or articles as may be positioned in the chamber 52 of the appliance 50.

Figure 2:
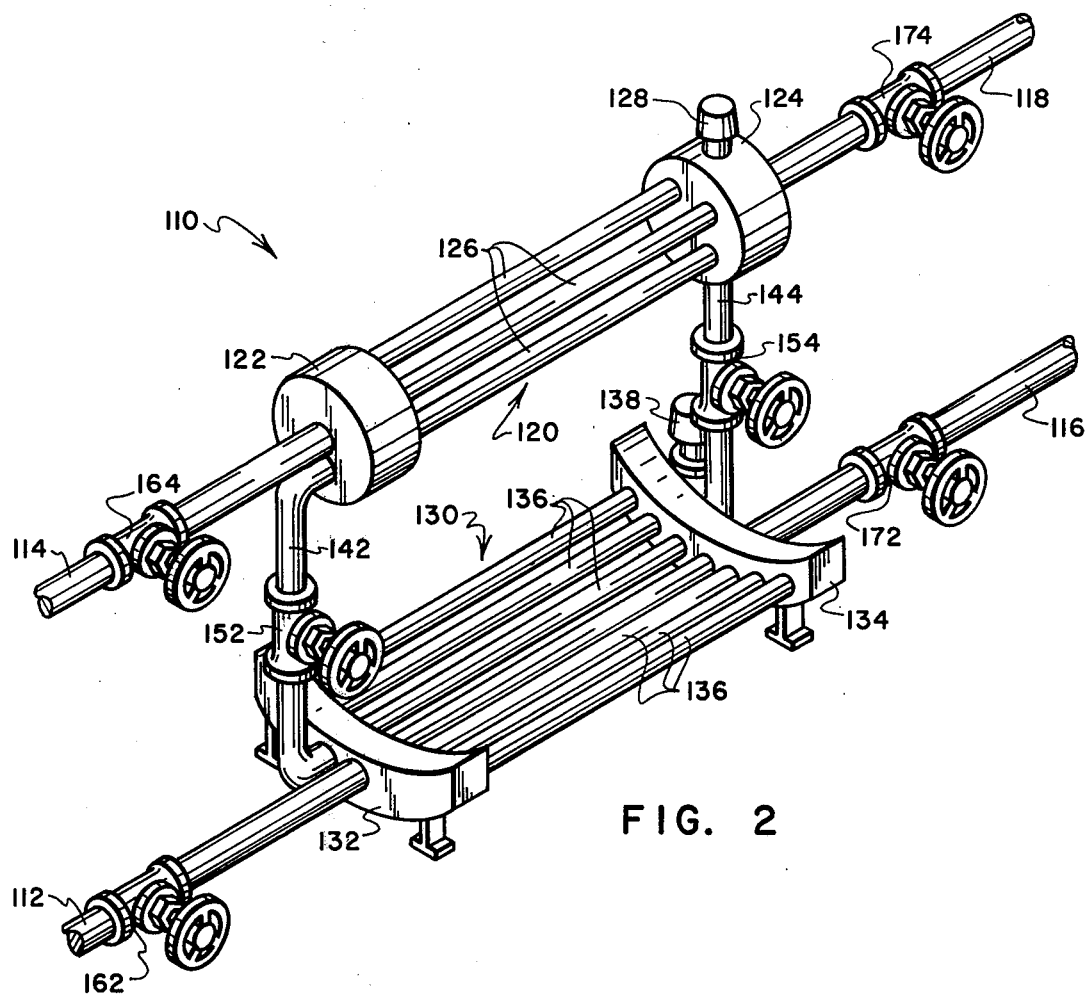
FIG. 2 is a perspective view of a heating unit employed in the system of FIG. 1.

Referring to FIGS. 1 and 2, the fireplace heating unit 110 includes upper and lower chamber-defining portions 120, 130. The upper chamber-defining portion 120 is positioned to overlie the area of combustion in the fireplace 60 so that hot combustion gases and/or flames of combustion impinge upon the outer walls of the upper chamber-defining portion 120 causing water within the upper chamber-defining portion 120 to be heated. The lower chamber-defining portion 130 is positioned generally beneath the area of combustion and may be utilized to support fuel for combustion in the fireplace 60.

The upper chamber-defining portion 120 is provided with a pair of manifolds 122, 124 located at its opposite ends, and with a plurality of conduits 126 extending in parallel to communicate the manifolds 122, 124. A conventional pressure-relief valve 128 connects with the manifold 124 to relieve excessive pressure in the upper chamber-defining portion 120.

The lower chamber-defining portion 130 includes a pair of manifolds 132, 134 and a plurality of conduits 136 extending in parallel to communicate the manifolds 132, 134. A conventional pressure-relief valve 138 connects with the manifold 134 to relieve excessive pressure in the lower chamber-defining portion 130.

A pair of riser conduits 142, 144 communicate overlying manifolds of the upper and lower chamber-defining portions 120, 130. Riser control valves 152, 154 are positioned in the riser conduits 142, 144 to control communication between the upper and lower chamber-defining portions 120, 130. Inlet control valves 162, 172 control the supply of water from the inlet conduits 112, 116 to the lower manifolds 132, 134. Outlet control valves 164, 174 control the flow of water from the upper manifolds 122, 124 to the outlet conduits 114, 118.

One or more expansion tanks 180 may be coupled to the outlet conduits 114, 118 (only one such tank is shown in FIG. 1) to accommodate expansion and contraction of the volume of water in the heating system. The use of expansion tanks in heating systems is known and need not be described in greater detail here.

In operation, the fireplace heating system 100 can be used to augment the operation of the boiler 12, e.g., as an auxiliary supply of heat to the circulating hot water heating system 10. Alternatively, the fireplace heating system 100 can be used to supply energy to the appliance 50. As still another possibility, the fireplace heating system 100 can be used to simultaneously supply heat energy to one or more appliances 50 connected in parallel and/or to the circulating hot water heating system 10.

The operation of the fireplace heating system 100 is controlled by selectively opening and closing the valves 152, 154, 162, 164, 172, 174. If the heating system 100 is to be used simply to augment the supply of heat to the circulating hot water heating system 10, the valves 154, 162, 164 are opened and the valves 152, 172, 174 are closed so that cold water from the return line 24 is supplied through the inlet conduit 112 to the lower chamber-defining portion 130 wherein it begins to be heated, rises through the riser conduit 144, is further heated in the upper chamber-defining portion 120, and discharges to the supply line 22 through the outlet conduit 114.

If the heating system 100 is to be utilized to supply energy exclusively to the appliance 50, the valves 152, 172, 174 are opened and the valves 154, 162, 164 are closed so that cold water is delivered to the fireplace heating unit 110 through the inlet conduit 116 and heated water is delivered from the fireplace heating unit 110 through the outlet conduit 118. The valve 162 may be opened from time to time or may be kept open during this type of operation to permit any needed make-up water to be supplied to the fireplace heating unit 110 through the pipes 30, 24, 112.

In the event that the fireplace heating system 100 is to be utilized to simultaneously supply energy to the circulating system 10 and to the appliance 50, the valves 152, 154, 162, 164, 172, 174 are all opened to permit water to flow essentially on a "requirements" basis through the inlet conduits 112, 116 to the lower portion 130, through the risers 142, 144 to the upper portion 120, and out through the outlets 114, 118 to the system 10 and to the appliance 50.

In the event the fireplace heating system 100 is to be utilized in place of the operation of the boiler 12, the supply and return valves 40, 42 to the boiler 12 are closed and the inlet and outlet valves 162, 164 to the fireplace heating unit are opened together with either or both of the riser valves 152, 154 so that the fireplace heating unit 110 is "on line" with the room heating radiators 26.

The pressure relief valves 128, 138 are provided as a safety measure. In the event that the fireplace 60 is inadvertently put into operation while all of the valves 152, 154, 162, 164, 172, 174 are closed, it is possible that water heated in the heating unit 110 may expand generating undesirably high pressure within the unit 110. The pressure relief valves 128, 138 provide a safe and automatic means of relieving such excessive pressure.

While only one exemplary appliance 50 has been shown as being connected through a pair of valves 172, 174 to the fireplace heating unit 110, it will be understood that a plurality of such appliances 50 can be connected through additional pairs of valves (not shown) to the fireplace heating unit 110 so that heat energy can be selectively supplied individually or simultaneously to such appliances and/or to the heating system 10.

The fireplace heating unit 110 depicted in FIG. 2 can also be used in a wood-burning furnace. While the space available for use in a wood-burning furnace is more limited than is available in a fireplace, the upper and lower chamber-defining portions 120, 130 can be diminished in size and altered in configuration to conform to the space available inside a wood-burning furnace. The riser conduits 142, 144 and the valves 152, 154 are preferably located externally of the combustion chamber when the heating unit 110 is positioned in a wood-burning furnace.

Figure 3:
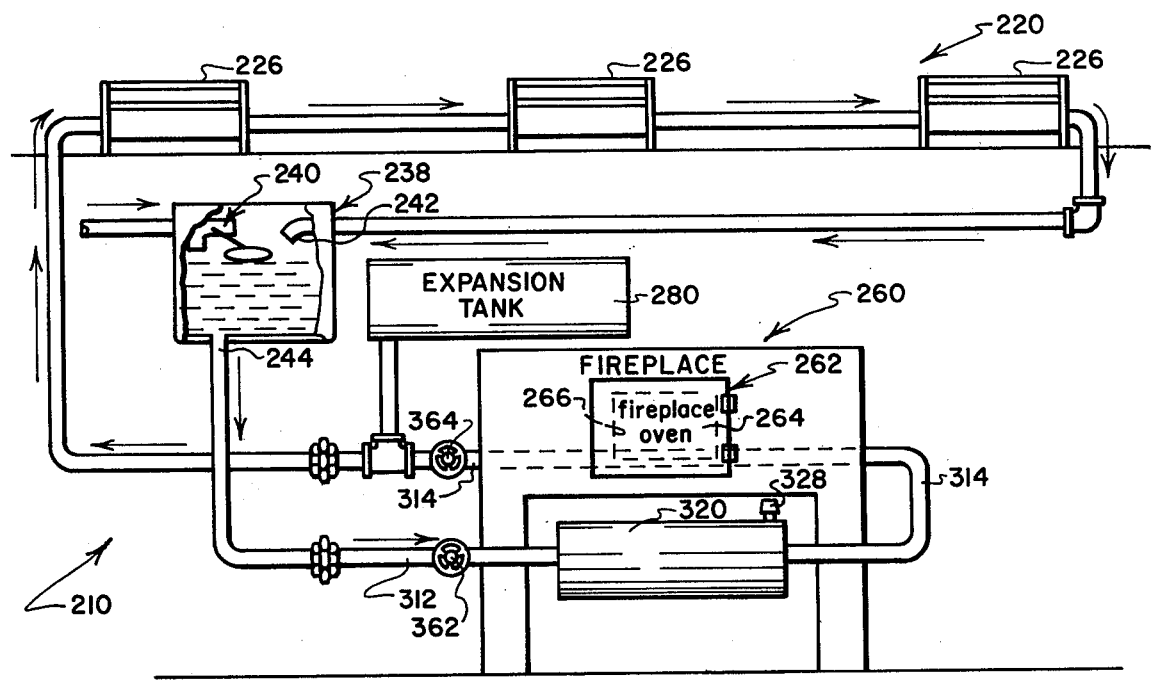
FIG. 3 is a schematic view illustrating the general arrangement of components of a circulating hot water home heating system with a fireplace heater system embodying an alternate practice of the present invention; and, FIG. 4 is a schematic view illustrating the general arrangement of components of a heating system embodying another alternate practice of the present invention wherein the system is used to transfer combustion heat energy from a wood-burning stove to a novel hot water heater appliance.

Referring to FIG. 3, an alternate embodiment of a home heating system is indicated generally by the numeral 210. While no heat-energy-consuming appliance is shown as being connected to the heating system 210, it will be understood that such an appliance can be connected to the system 210 in substantially the same manner as the appliance 50 is connected to the home heating system 10.

In FIG. 3, a fireplace is indicated generally by the numeral 260. The fireplace 260 is fitted with a built-in oven 262 located above the combustion zone of the fireplace 260 so that heat energy generated by combustion in the fireplace can be transferred directly to the oven 260 to cook food utilizing heat from the fireplace. The oven 262 has a hinged front door 264 which provides access to a baking chamber 266.

The system 210 includes a fireplace heating unit 320. A pair of inlet and outlet conduits 312, 314 connect the fireplace heating unit 320 to a circulating hot water heating system 220. A pair of control valves 362, 364 are interposed in the conduits 312, 314 and are utilized in substantially the same manner as are the valves 162, 164 in the system of FIGS. 1 and 2.

The heating system 220 is an add-on heating system for use in homes which have forced-air heating and do not, therefore, already have a conventional circulating hot water heating system of the type shown in FIG. 1. The system 220 utilizes the fireplace heating unit 310 as its sole source of energy, the delivers heated water from the fireplace heating unit 320 to a plurality of conventional baseboard heaters 226 which are connected in series. An expansion tank 280 is connected to the outlet conduit 314 as is conventional to provide for expansion and contraction of the volume of heated water in the system.

In order to assure that no excessive pressure force builds up in the heating system 220, an open reservoir tank 238 is interposed in the flow path followed by water returning from the radiators 226 to the fireplace heating unit 320. The reservoir tank 238 houses a conventional float control valve 240 which controls the supply of make-up water to the tank 238. Water from the radiators 226 discharges into the tank 238 through an open pipe end 242. Water is supplied from the tank 238 to the fireplace heating unit 320 through a pipe 244. The valve 240 maintains a suitable level of water in the tank 238. If pressure should tend to build up in the system 220, it will be relieved by tending to cause water to back up into the tank 238. The top of the tank 238 is open to atmosphere. While the tank 238 has been illustrated as being used only in the system of FIG. 3, it can, of course, be used in any of the other systems described herein.

The fireplace heating unit 320 includes a single chamber-defining portion which is positioned to overlie the area of combustion in the fireplace 260 so that hot combustion gases and/or flames of combustion impinge upon the outer wall of the unit 320 causing water within the unit 320 to be heated. A conventional pressure-relief valve 328 connects with the unit 320 to relieve excessive pressure in the unit 320.

In operation, the fireplace heating system 210 can be used to augment the operation of a forced air heating system (not shown) as an auxiliary supply of heat to a home. Alternatively, the fireplace heating system 210 can be used to supply energy to an auxiliary appliance, such as the appliance 50 shown in FIG. 1. As still another possibility, the fireplace heating system 210 can be used to simultaneously supply heat energy to the home heating system 220 or to one or more appliances.

Figure 4:
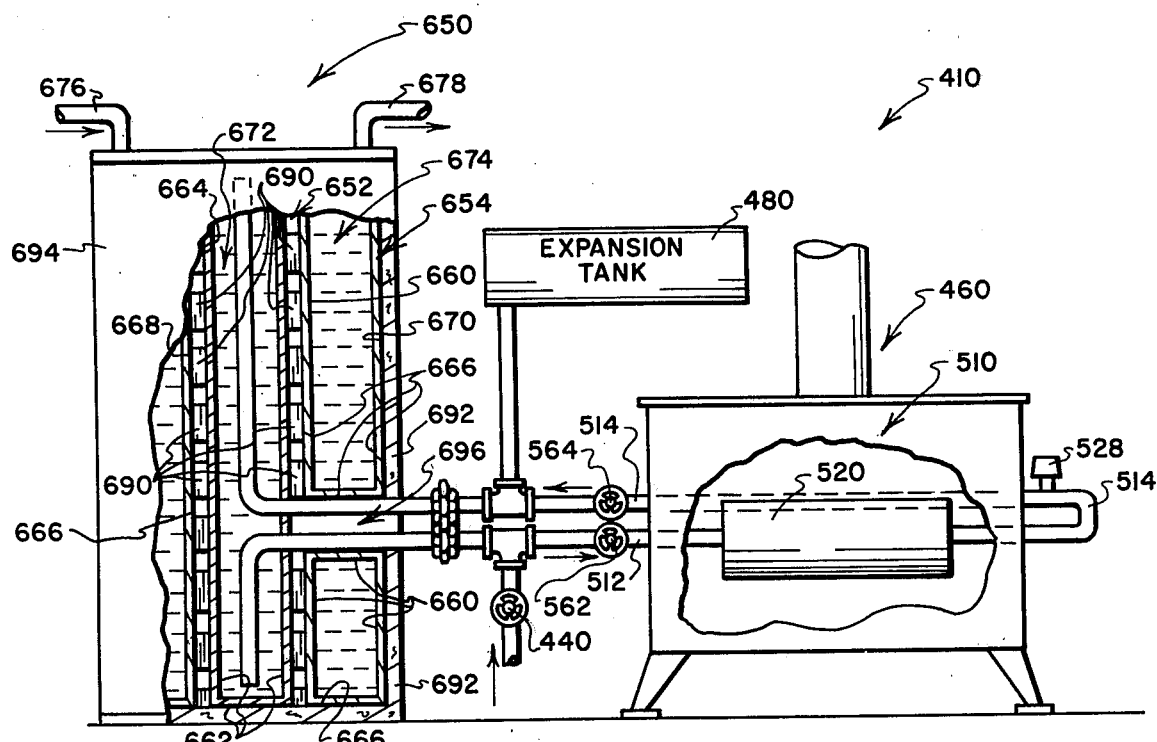

Referring to FIG. 4, still another embodiment of home heating system is indicated generally by the numeral 410. While a novel water heater appliance 650 is shown as a component of the system 410, it will be understood that the system 410 can be utilized to transfer combustion heat energy to such other systems and/or appliances as have been described previously. The system 410 utilizes a woodburning stove 460 as its source of combustion heat energy. A heating unit 510, which is substantially the same as the previously described unit 320, is employed to collect combustion heat energy, to utilize such energy to heat a circulating flow of water, and to transfer such heat energy to a remote location via a circulatory flow of water.

The heating unit 510 includes a single chamber-defining portion 520 which is positioned to overlie the area of combustion in the wood-burning stove 460. A pair of inlet and outlet conduits 512, 514 connect the heating unit 510 to the appliance 560. A pair of control valves 562, 564 are interposed in the conduits 512, 514 and are utilized in substantially the same manner as are the values 312, 314 in the system of FIG. 3. A supply valve 440 connects with the inlet conduit 312 for supplying any needed makeup water to the system 410. An expansion tank 480 and a pressure relief valve 528 are coupled to the system 410 in substantially the same manner as the corresponding components 280 and 328 connect with the system of FIG. 3.

The hot water heating appliance 650 includes an inner, upstanding, generally cylindrical tank 652 and a surrounding outer tank 654. The inner tank 652 has walls 662 (including a cylindrical upstanding wall portion 664) which define a first closed chamber 672 with which the inlet and outlet conduits 512, 514 communicate. The outer tank 654 has walls 666 (including an inner cylindrical upstanding wall portion 668 and an outer cylindrical upstanding portion 670) which define a second closed chamber 674. A supply conduit 676 connected with the household cold water supply delivers pressurized cold water to lower portions of the second, outer chamber 674. A delivery conduit 678 delivers heated water from upper portions of the chamber 674.

The side wall portion 664 of the inner tank 652 is spaced from the inner side wall portion of 668 of the outer tank 654 so that, in the event either of these wall portions should develop a leak, water leaking therefrom will flow downwardly in this space and onto the floor beneath the appliance 650 thereby drawing attention to the leak and preventing such leak from causing any intermingling of water between the closed chambers 672, 674. This construction provides a safety feature that prevents water from the heating system 410 from commingling with the household supply of drinking water.

A plurality of metal heat-transferring fins or spacers 690 are positioned in the space between the inner and outer tanks 652, 654. A blanket of insulation 692 is wrapped about the outer tank 654. A suitable protective cover 694 jackets the insulation blanket 692.

In order that the inlet and outlet conduits 512, 514 may communicate directly with the inner tank 652, a passage 696 is formed through the outer tank 654. The inlet conduit 512 is configured to draw cold water from lower portions of the tank 652, while the outlet conduit 514 is configured to deliver heater water to upper portions of the tank 652.

In operation, the system 410 utilizes the heating unit 510 to circulate and heat a flow of water so that the water in the inner tank 652 is sufficiently hot to transfer heat to the water in the outer tank 654. By this arrangement, the system 410 operates to utilize combustion heat energy from the wood burning stove 460 to heat a household water supply in the appliance 650.

Although the invention has been described in its preferred form with a certain degree of particularity, it will be understood that the present disclosure of the preferred embodiment has been made only by way of example and that numerous changes may be resorted to without departure from the true spirit and scope of the invention as hereinafter claimed. It is intended that the patent shall cover, by suitable expression in the appended claims, whatever features of patentable novelty exist in the invention disclosed.

What is claimed is:

1. A heating system, comprising:
   (a) heating unit means for positioning in a combustion zone of a fireplace or wood-burning stove, for receiving combustion heat energy and for transferring such heat energy to a circulating flow of water;
   (b) conduit means for ducting a circulating flow of water to and from the heating unit means to effect transfer to heat energy from the combustion zone to a remote location;
   (c) the heating unit means including:
      (i) an upper chamber-defining portion configured to overlie a part of the combustion zone so that water contained in the upper portion is heated by combustion gases and flames impinging on the outer surface of the upper portion:
      (ii) a lower chamber-defining portion configured to underlie a part of the combustion zone and to support fuel for combustion;
   (d) first valve means for selectively communicating the heating unit means with a heat-energy-consuming appliance capable of utilizing heat energy supplied via a circulating flow of water;
   (e) second valve means for selectively communicating the heating unit means with a circulating hot water home heating system whereby the heating unit means can be utilized to deliver heat energy to the home heating system;
   (f) riser conduit means communicating the upper and lower chamber-defining portions; and,
   (g) third valve means for controlling the flow of water through the riser conduit means.

2. The heating system of claim 1 wherein the structure defining the first and second chambers is configured to separate these chambers such that if a leak should develop in either of these structures, the contents of the chambers will not be permitted to intermingle.

3. The heating system of claim 1 wherein one of the first and second chambers extends in surrounding relationship to the other of these chambers.

4. The heating system of claim 3 wherein the appliance is a water heater, and the first chamber surrounds the second chamber.

5. The heating system of claim 1 wherein:
   (a) a plurality of room radiator means are connected for delivering heat energy to rooms of a home in response to circulation of a flow of heated water through the radiator means; and,
   (b) said second valve means is operative to selectively communicate the room radiator means with the conduit means.

6. The heating system of claim 1 additionally including pressure-relief-valve means communicating with the heating unit means for relieving excessive pressure generated in the heating unit means.

7. The heating system of claim 1 wherein the heating unit is positioned in the combustion zone of a fireplace which has an oven built into the fireplace at a location above the combustion zone, whereby still further utilization of combustion heat energy generated in the fireplace can be made by cooking food in the oven.

8. The heating system of claim 1 wherein float-valve-controlled reservoir means open to the atmosphere is interposed in the conduit means for preventing undesired pressure buildup in the conduit means and for admitting make-up water to the system as it is needed.

* * * * *